United States Patent
Lorman

(10) Patent No.: US 6,834,879 B1
(45) Date of Patent: Dec. 28, 2004

(54) ELASTOMERICALLY ISOLATED TOW HITCH DRAWBAR

(75) Inventor: Leonard A. Lorman, Wickliffe, OH (US)

(73) Assignee: Robin Industries, Inc., Cleveland, OH (US)

( * ) Notice: Subject to any disclaimer, the term of this patent is extended or adjusted under 35 U.S.C. 154(b) by 0 days.

(21) Appl. No.: 10/241,041

(22) Filed: Sep. 12, 2002

(51) Int. Cl.$^7$ .............................................. B60D 1/00
(52) U.S. Cl. ................... 280/506; 280/386; 280/483
(58) Field of Search ............................. 280/483–486, 280/506; 267/138

(56) References Cited

U.S. PATENT DOCUMENTS

| | | | | |
|---|---|---|---|---|
| 2,011,817 A | | 8/1935 | Littlefield | 280/33.15 |
| 2,136,440 A | | 11/1938 | Hufferd | 280/33.15 |
| 2,501,721 A | * | 3/1950 | Hagenah | 280/484 |
| 3,768,826 A | * | 10/1973 | Hickman | 280/687 |
| 3,961,813 A | | 6/1976 | Thomas | 280/485 |
| 4,131,296 A | | 12/1978 | Strader | 280/485 |
| 4,191,398 A | * | 3/1980 | Willetts | 280/683 |
| 4,327,995 A | * | 5/1982 | Stewart | 403/224 |
| 4,596,399 A | * | 6/1986 | Clark | 280/492 |
| 4,883,283 A | * | 11/1989 | Hazelett et al. | 280/204 |
| 4,978,133 A | * | 12/1990 | Thorne et al. | 280/484 |
| 5,380,030 A | * | 1/1995 | Gullickson | 280/486 |
| 5,823,560 A | * | 10/1998 | Van Vleet | 280/484 |
| 6,260,873 B1 | * | 7/2001 | Bishel et al. | 280/486 |
| 6,502,845 B1 | * | 1/2003 | Van Vleet | 280/491.1 |
| 6,581,953 B2 | * | 6/2003 | Jerry | 280/486 |

* cited by examiner

Primary Examiner—Lesley D. Morris
Assistant Examiner—L. Lum
(74) Attorney, Agent, or Firm—Joseph H. Taddeo

(57) ABSTRACT

A damped drawbar for use in towing a drawn trailer that provides for the attenuation of noise, shock, and vibration that may be conducted into the towing vehicle. The newly designed drawbar uses a resilient elastomer, operating in shear, sandwiched between an outer steel tube and an inner steel tube, to reduce noise by damping the undesirable vibrations. A cushioned hitch pin coacting with the ovate holes in the inner tube, reduces the noise from a jolt caused by the hitch pin over-travel, during acceleration or deceleration, by as much as 95 percent. The hitch pin coacting with the ovate holes in the inner tube, serves as a mechanical fail-safe should the towed member be grossly beyond the drawbar's rated load capacity.

17 Claims, 9 Drawing Sheets

ELASTOMERICALLY ISOLATED TOW HITCH DRAWBAR

FIELD OF INVENTION

The present invention relates primarily to an apparatus for coupling a driven prime mover to a drawn load, and more particularly, to a coupling apparatus having a resilient coupling component to attenuate the transmitted noise, shock and vibration that is normally conducted into the towing vehicle, and whose hitch is detachably removable.

BACKGROUND OF THE INVENTION

The purpose of a hitch is to connect a towed load, such as a trailer or implement to a tow vehicle. The most common type of hitch in use today is the drawbar type of hitch.

There are at least five major load classifications, where a Class I rating can tow up to a 2,000 pound load; a Class II rating, up to a 3,500 pound load; and a Class III hitch is rated to haul up to a 5,000 pound load and is used to haul loads, such a car, boat, camper, or the like. For heavier loads, such as with a heavier boat or camper, a Class IV hitch, whose rating is up to a 7,500 pound load, would be required; a Class V hitch having a 10,000 pound rating.

Other than the tow vehicle and the trailer load, the other critical element is the hitch. Trailer hitches are rated according to the capacity of the load weight and tongue weight, where the load weight is referenced in terms of Gross Trailer Weight (GTW) and the tongue weight is the downward force exerted on the hitch ball. The tongue weight is usually calculated as being 10 to 15 percent of the maximum rated GTW. The tongue is usually formed from the V-shaped frame-rails that merge at the front of the trailer. The coupler of the trailer is what accepts the hitch ball.

At the trailer's end of the hitch, there is just one variable to consider and that is the size of the ball—at the tow vehicle's end of the hitch, there are several variables that are necessary to consider.

First, it is important that the hitch coupler ball on the trailer be matched to the proper size coupler ball; otherwise the latching mechanism may fail to retain the hitch on the ball. A safety chain can be used to keep the trailer connected in the event the hitch separates.

There are three common sizes of hitch coupler balls for passenger type vehicles; they are: 1⅞-inch for use with towed weight loads of less that 2,000 of towed weight, a 2-inch coupler ball is used for towed weights up to 3,500 pounds and 2 5/16-inch coupler ball can be used with loads up to 10,000 pounds.

Regarding the tow vehicle side of the connection, there are also several items to consider. Today's modern cars have bumpers that are not suitable for use as an attachment point for a hitch. The vast majority of hitches are mounted to the car chassis undercarriage or frame.

The most common hitch is the drawbar type, which bolts to the undercarriage of the tow vehicle and provides a receiver pocket into which a steel drawbar for the hitch is secured. This type of mounting arrangement is advantageous because the drawbar and hitch coupler ball can be easily removed when not in use.

A drawbar is a bar that joins a vehicle to a drawn vehicle or implement. The drawbar can also be enhanced beyond being just a straight piece of steel. A straight drawbar is subject to several disadvantages, the main one being the transmission of noise and rattles into the tow vehicle.

The following prior art discloses the various aspects in the design and use of the elastomerically coupled drawbar.

U.S. Pat. No. 2,011,817, granted Aug. 20, 1935, to H. S. Littlefield, discloses a flexible coupling, for use primarily in coupling trailers to automobiles and/or trucks, but also to having various other types of farm equipment coupled to tractors, mine cars coupled to locomotives, etc.

U.S. Pat. No. 2,136,440, granted Nov. 15, 1938, to G. H. Hufferd, discloses a trailer hitch having a resilient bushing seated therein. The bushing has a hole therethrough in communication with the open ends of the housing.

U.S. Pat. No. 3,961,813 granted Jun. 8, 1976, to O. L. Thomas, discloses a trailer hitch for coupling a draft vehicle to a drawn vehicle wherein the eye portion of the hitch includes a molded insert of flexible material having an axial bore extending therethrough adapted to receive the pintle portion of the hitch in coupling relation. The flexible insert completely surrounds the pintle and thus maintains the pintle in spaced relation from the eye for yieldingly restraining relative radial movement between the pintle and the eye during all phases of operation, including flexing in the vertical plane when the trailer is negotiating inclined ramps or the like.

U.S. Pat. No. 4,131,296, granted Dec. 26, 1978, to D. S. Strader, discloses a trailer hitch comprising a draw tongue adapted to extend from a trailer, a handle mounted for pivotal movement above the draw tongue, and a cable attached at one end to the handle and extending downwardly through the draw tongue to a hitch coupler which is carried for bodily movement upwardly and downwardly as a function of pivotal motion of the handle. A drawbar adapted to be attached to a towing vehicle is slotted to receive the hitch coupler and recessed to capture the coupler as pivotal movement of the handle moves the latter upwardly. A resilient bushing of elastomeric material is captured in compression between the drawbar and the draw tongue resiliently to permit relative movement in all planes and to damp road shock therebetween.

Presently, the above prior art teaches of a hollow resilient bushing made of an elastomeric material, mounted in a vertical direction, about a stud member. The resulting attenuation of noise and vibration that is conducted though the elastomeric member is proportional to the wall thickness of the elastomer cylinder, where the transmitted forces are attenuated only by the compressive forces acting outwardly in a radial direction from the inner surface of the resilient bushing.

What is needed is a means of incorporating a shock absorbing material into the drawbar, to provide a better ride quality to the passengers of the tow vehicle.

It is therefore an object of the present invention to provide for a drawbar to couple a driven prime mover to a drawn load, the drawbar having a longitudinally mounted elastomeric member communicating with an inner and outer housing, where the elastomeric member is resistant to any resultant shear forces.

It is another object of the present invention to provide for a drawbar to couple a driven prime mover to a drawn load, that reduces the shock, noise, bounce and vibration that are typically related when towing.

It is still another object of the present invention to provide for a drawbar to couple a driven prime mover to a drawn load, that reduces the amount of wear due to shock, noise, bounce and vibration that are typically related when towing.

It is still yet another object of the present invention to provide for a drawbar to couple a driven prime mover to a drawn load, that utilizes a resilient linear damping element to dynamically isolate the load disturbances from the driven vehicle.

It is a still another object of the present invention to provide for a drawbar to couple a driven prime mover to a drawn load, that uses a elastomerically cushioned hinge pin to further reduce the shock, noise, bounce and vibration that are typically related when towing.

It is a final object of the present invention to provide for a clamp to take up any play between the prime mover receiver tube and the drawbar tube. This clamping serves to direct all of the shock, noise, bounce and vibration that are typically related when towing through the elastomeric elements.

These as well as other objects and advantages of the present invention will be better understood and appreciated upon reading the following detailed description of the preferred embodiment when taken in conjunction with the accompanying drawings.

SUMMARY OF THE INVENTION

The present invention is comprised of a square outer tube made of a low carbon steel that has the mechanical strength to withstand the hoop stress and additional forces occurring in all directions placed upon it principally by the elastomeric elements and the tow vehicle's hitch receiver. The low carbon steel square outer tube is sized to fit over the industry standard receiver tube and to accept the hitch pin through the cross hole.

A square inner tube, also made of a low carbon steel, has an outboard end extension that is sufficient in length in relation to the outer tube to facilitate a weld attachment of various rise and/or drop tongues for balls, pintle adapter plates, and other connections commonly seen in the industry. Its inboard end extends beyond the surrounding elastomer element and also possesses a through slot. This slot is coincident with but larger than the cross hole on the outer tube. This arrangement functions as a mechanical fail-safe should the towed member be grossly beyond the drawbar's rated capacity such as, by pulling a trailer that is too heavy or by attempting an unusual tow truck maneuver.

High hysteresis elastomeric sleeves are compressed and contained between the inner tube and outer tube to provide total isolation from noise and/or vibration that may be conducted from one tube to the other during typical operation. The elastomer functions to dampen the forces imposed upon the tow vehicle by the inertia of the towed trailer. Also, they may further damp the vibrations that emanate from the trailer and conducted via the drawbar and hitch pin to the towing vehicle. Also, many of these vibrations are caused by uneven road surfaces or by the shifting of cargo, such as, livestock, or other carried cargo.

All of the exposed metallic surfaces of the drawbar are treated, thereby being protected from corrosion by multiple step surface coatings.

The installation of this improved isolating drawbar is accomplished by sliding the tow vehicle's receiver tube into the drawbar's receiver cavity and securing it, preferably, by using the newly designed damped hitch, or alternatively, by using a commonly available hitch pin. Thus the installation requires the same familiar operation that is currently used in practice for the installation of a rigid drawbar.

BRIEF DESCRIPTION OF THE DRAWINGS

The present invention is pictorially illustrated in the accompanying drawings that are attached herein.

DETAILED DESCRIPTION OF THE INVENTION

The present invention relates to an improved elastomeric cushioned, tow hitch drawbar that provides shock and vibration isolation and noise reduction that is normally conducted into the towing vehicle emanating via the drawbar connected to the towed load. This newly designed shock absorbing and vibration damped coupling comprises an elastomeric cushioned hitch drawbar that reduces the slams and bangs associated with trailer towing, and especially when starting and stopping the towing vehicle. Reducing these jolts protects the towing vehicle's driveline and hitch assembly, as well as, the trailer contents.

Also, when towing a trailer after the period of acceleration or deceleration, there many be many vibrations, caused by rough road surfaces or uneven terrain, transmitted or induced into the towed trailer, and then conducted through the drawbar into the towing vehicle, thereby creating a noisy environment to the occupants. The use of the novel shock absorbing and vibration isolating drawbar, when used in conjunction with the companion hitch pin of the present invention will attenuate the noise, shock and vibration in the towing vehicle to an acceptable level and give a smooth comfortable ride to its occupants.

Figure 1:
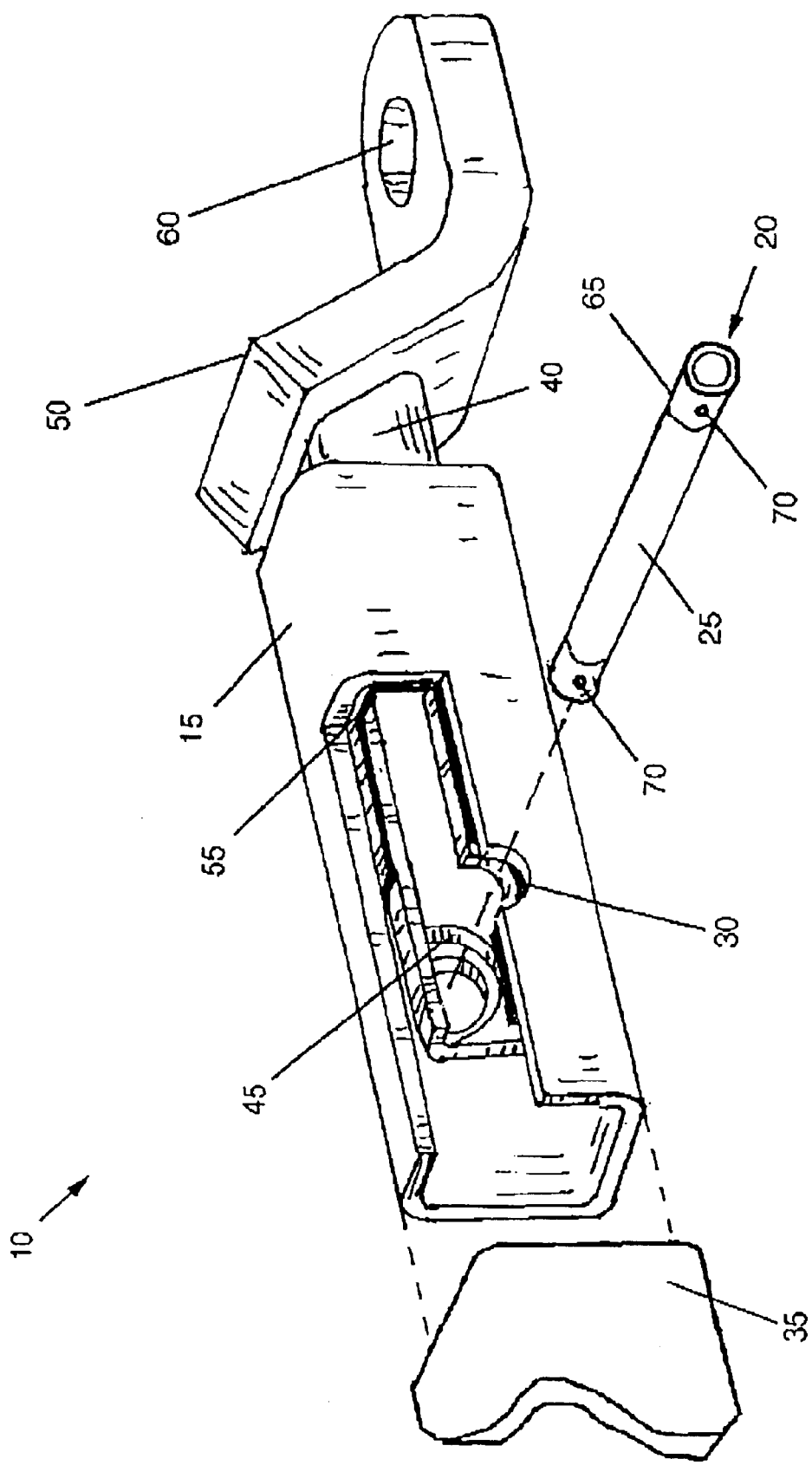
FIG. 1 is a perspective view of the preferred embodiment of the vibration and shock isolating hitch drawbar of the present invention, using square tubes, and being cutaway to show the details of the internal assembly.

Referring now to the drawings, there is shown in FIG. 1, the preferred embodiment 10 of the novel shock absorbing and vibration damped towing drawbar that comprises the present invention.

The outer square tube 15 is sized to fit slidably into the industry standard receiver tube 35 and to accept the polypropylene cushioned hitch pin 20, through the hitch pin receiving cross holes 30 that are orthogonal to the outer square tube 15. The outer square tube 15 is made preferably of a low carbon steel whose mechanical strength is capable of withstanding the external omnidirectional occurring forces exerted from the tow vehicle's hitch receiver tube.

Figure 2:
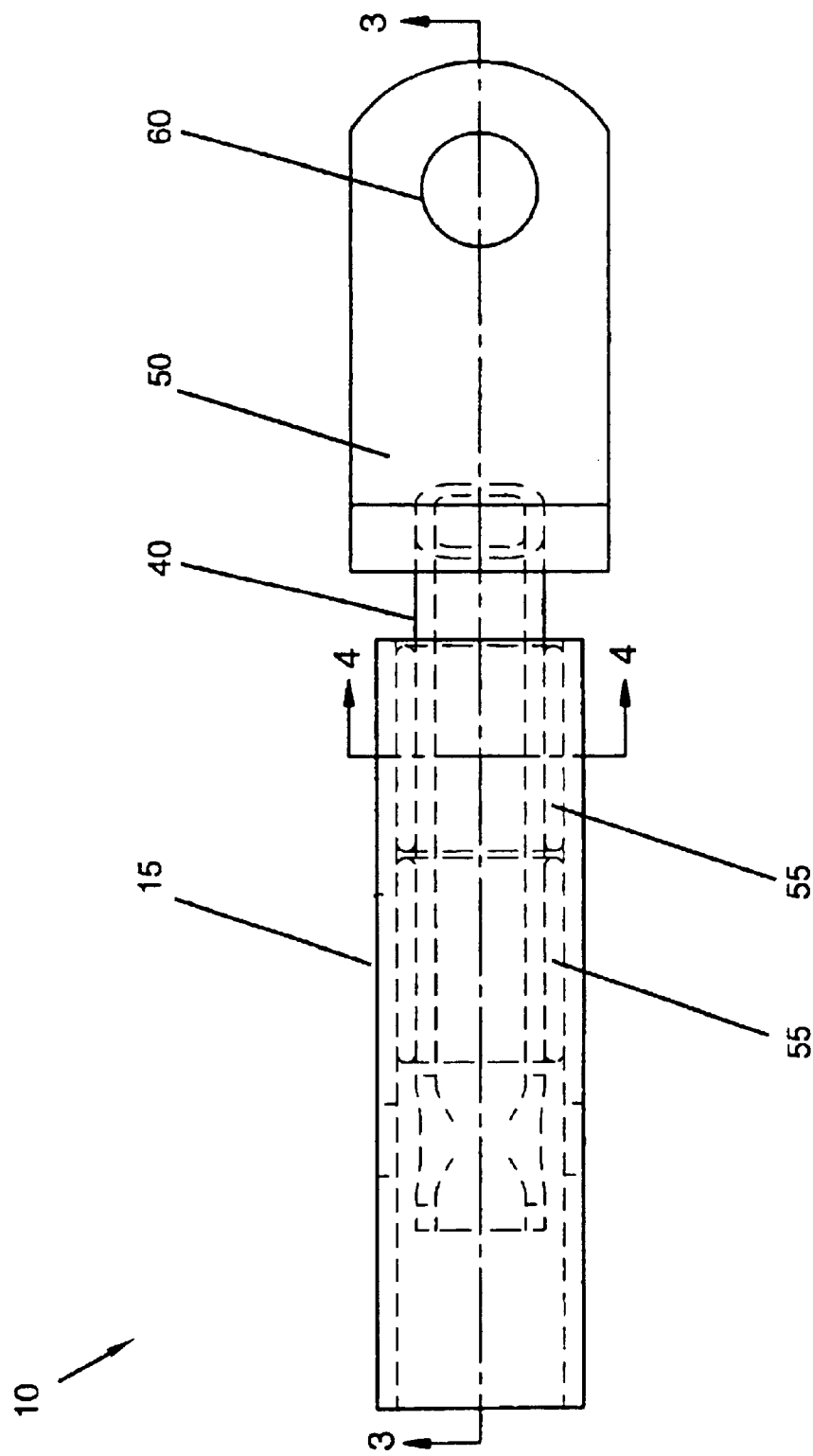
FIG. 2 is a side elevational view of the isolating hitch drawbar.
Figure 3:
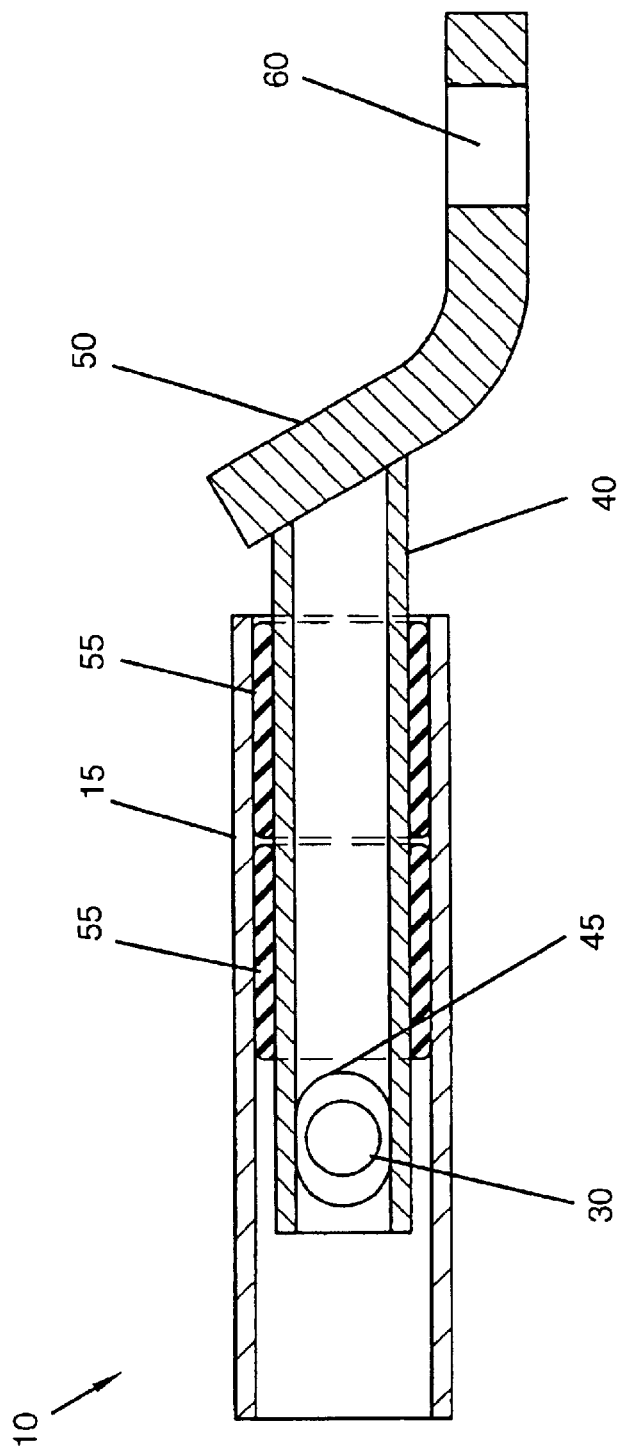
FIG. 3 is a sectional view taken along the line 3—3 in FIG. 2.

The inner square tube 40 is sized to fit slidably into the industry standard receiver tube 35. The inner square tube 40 is made preferably of low carbon steel whose mechanical strength is capable of withstanding the external omnidirectional occurring forces exerted from the tow vehicle's hitch receiver tube. FIG. 1 and FIGS. 2–3 show that ball mount bracket 50 is welded to the extreme end of the inner square tube 40, where there are various assorted sizes of ball mount rises and drops, and having angles ranging from 0 to 90 degrees. All these variations of rise, drop and angle are necessary to customize the coupling of the towing vehicle to towed trailer, so that when the hitch drawbar 10 is installed, it is in a horizontal position, parallel to the ground pavement.

Located at the opposite end of the inner tube 40 are the hitch pin cross holes 45, that are ovately shaped, thereby allowing sufficient clearance from the hitch pin in the minor vertical axis to permit full vertical motion of the polypropylene cushioned hitch pin 20. Along the major horizontal axis of the ovate clearance holes 45, the hitch pin 20 is allowed to travel an increased distance before being stopped by coming in contact with walls of the inner tube 40. This increased degree of freedom permits the inner square tube and ball mount assembly to move longitudinally, relative to the receiver tube 35, in either a forward or backward direction as determined by the reaction of the towed load.

Figure 4:
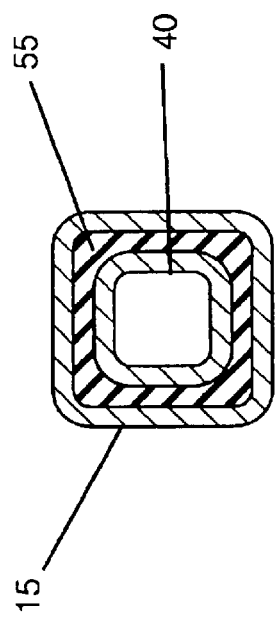
FIG. 4 is a sectional view taken along the line 4—4 in FIG. 2.

FIG. 4 shows that lying intermediately between the inner surface of the outer tube 15, and the outer surface of the inner tube 40 is a resilient layer of elastomeric material 55. This elastomeric layer can be made preferably of a natural rubber that is vulcanized, and bonded to the metal surfaces of the inner and outer tubes, or alternatively, made of a synthetic rubber that is chemically bonded to these surfaces.

Dynamically, the elastomeric material that is sandwiched between the inner and outer tubes functions primarily in a shear mode of operation, where the shearing stress is given as:

Shearing stress=the applied longitudinal force/the surface area

Figure 5:
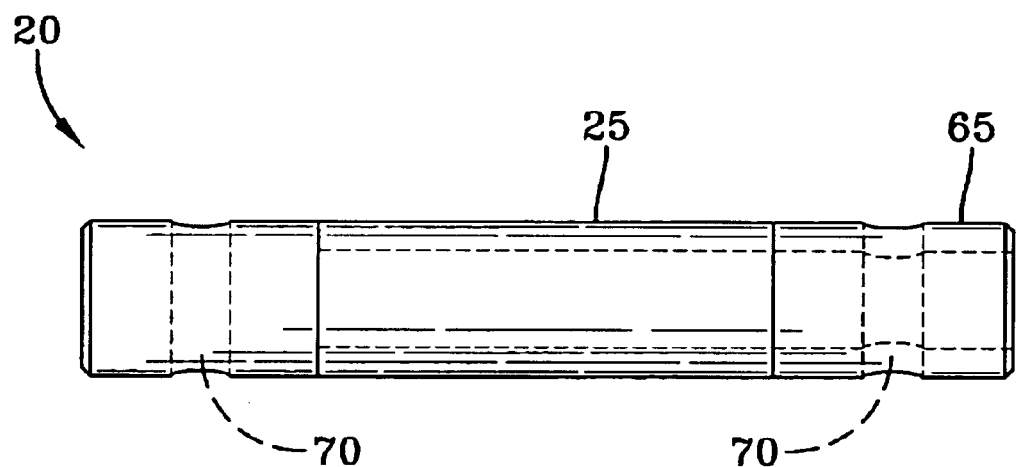
FIG. 5 is a side elevational view of the vibration and shock isolating hitch pin.
Figure 5A:
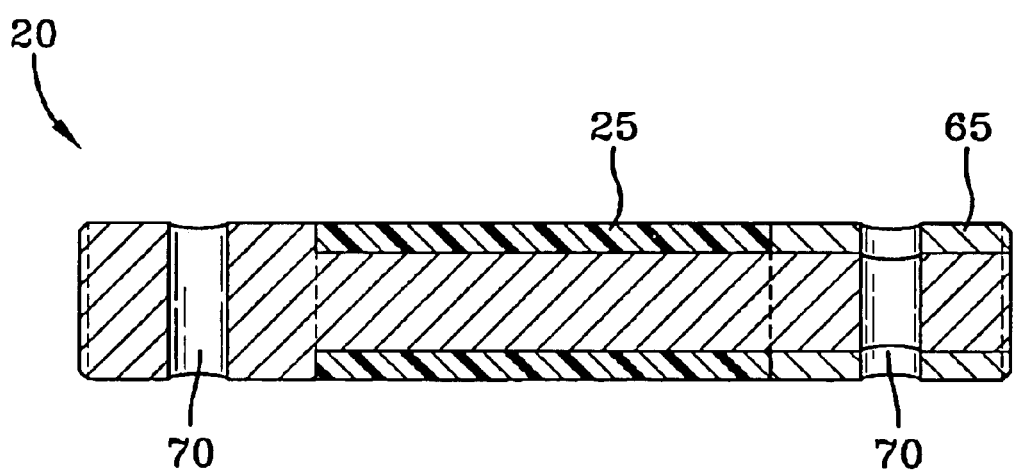
FIG. 5A is a side sectional view of the vibration and shock isolating hitch pin.

There is shown in FIGS. 1, 5 and 5A, the newly designed cushioned hitch pin 20. It is made of a low carbon steel, having preferably, a polypropylene cylindrical tube 25, slide fitted over the central portion of the pin. A steel bushing 65, having the same inside diameter and wall thickness as the polypropylene cushion, maintains the plastic bushing centrally in position. Two holes 70, located at each end of the hitch pin 20, each receive a cotter pin or spring clip 80 to secure the hitch pin upon its installation.

During installation, the drawbar is slid into the receiver cavity, where the coupling is secured by using the cushioned hitch pin 20. The drawbar 10 is then secured to the receiver with a hitch pin 20 that is inserted through openings 30 and 45 in both pieces and is retained using a spring clip 80.

Figure 6:
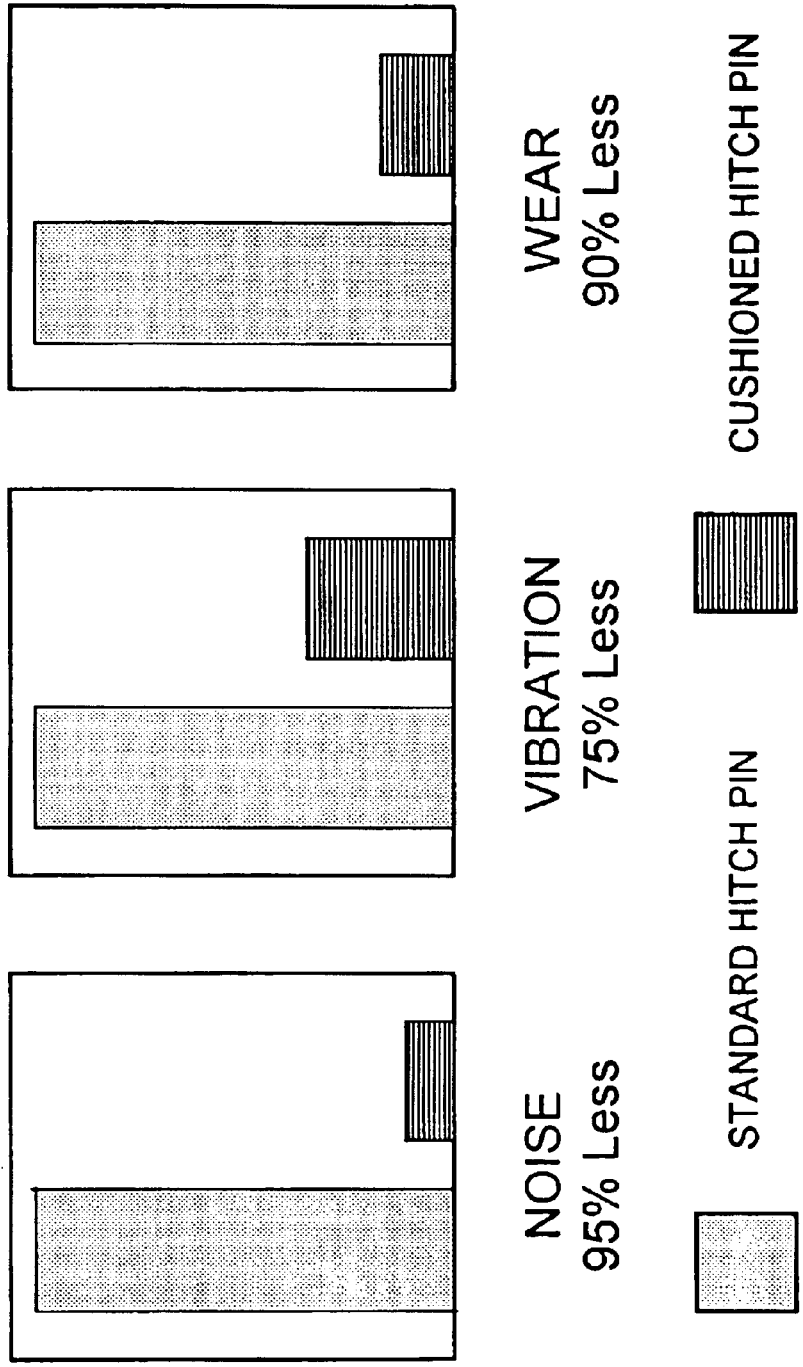
FIG. 6 is a series of three graphs illustrating a graphical comparison of the performance of the cushioned hitch pin vs. a standard hitch pin.

In the event of a severe longitudinal jolt along the horizontal axis, where the cushioned pin 20 impacts the sidewall end of the ovate hole 45 found in the inner tube 40, the polypropylene tube 25 compresses in the region of contact with wall of the ovate hole 45, the noise emanating from this impact is reduced to less than 95 percent, as shown in FIG. 6; the vibration reduced by 75 percent and the wear reduced 90 percent.

FIG. 6 is a series of three graphs illustrating a graphical comparison of the performance of the cushioned hitch pin vs. a standard hitch pin.

Figure 7:
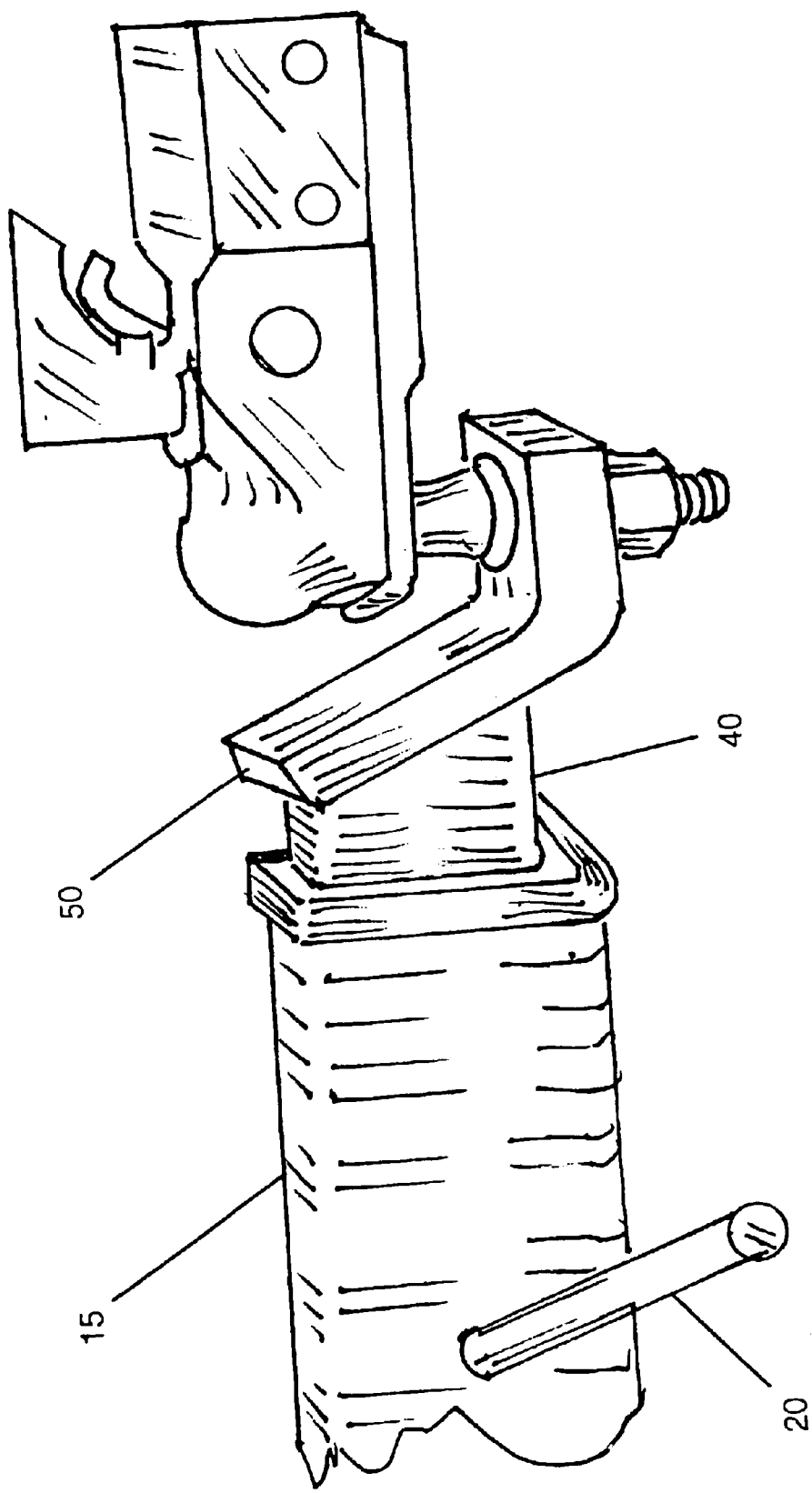
FIG. 7 is a perspective view of the preferred embodiment of the vibration and shock isolating hitch drawbar as used in a typical installation.

FIG. 7 best illustrates a typical installation of the present invention, where the novel elastomerically isolated drawbar, having the ball mounted to the drawbar through, and coupled to a standard type hitch.

Figure 8:
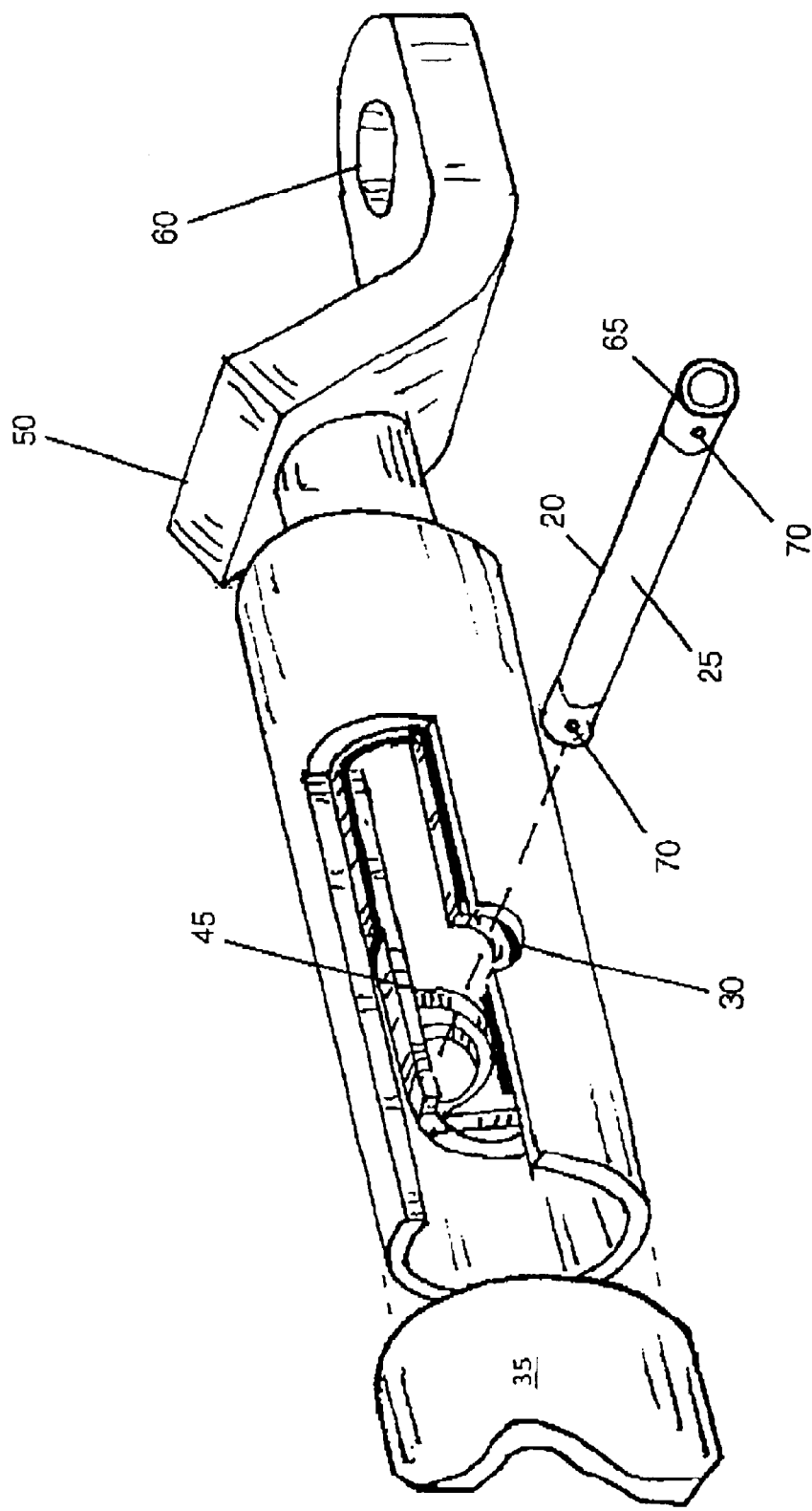
FIG. 8 is a perspective view of an alternative embodiment of the vibration and shock isolating hitch drawbar of the present invention, using round tubes, and being cutaway to show the details of the internal assembly.

FIG. 8 is an alternative embodiment using round tubes instead of square tubes. Round tube hitches are usually formed with round tubing 15A and 40A to compliment the contours of towing vehicle's rear bumper and body to give the closest fit and best look possible.

Figure 9:
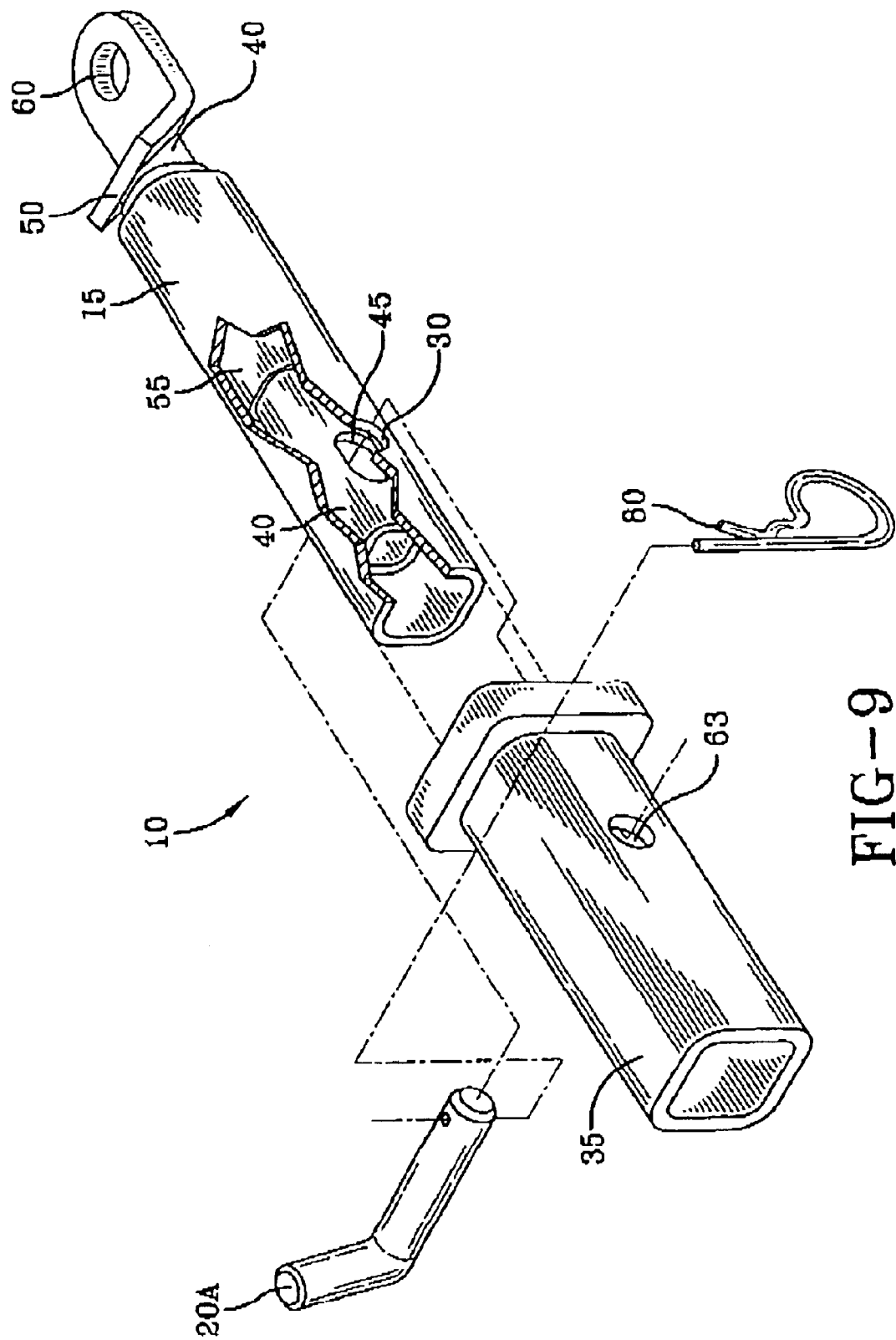
FIG. 9 is a perspective view of the preferred embodiment of the vibration and shock isolating hitch drawbar as used in a typical installation.
Figure 10:
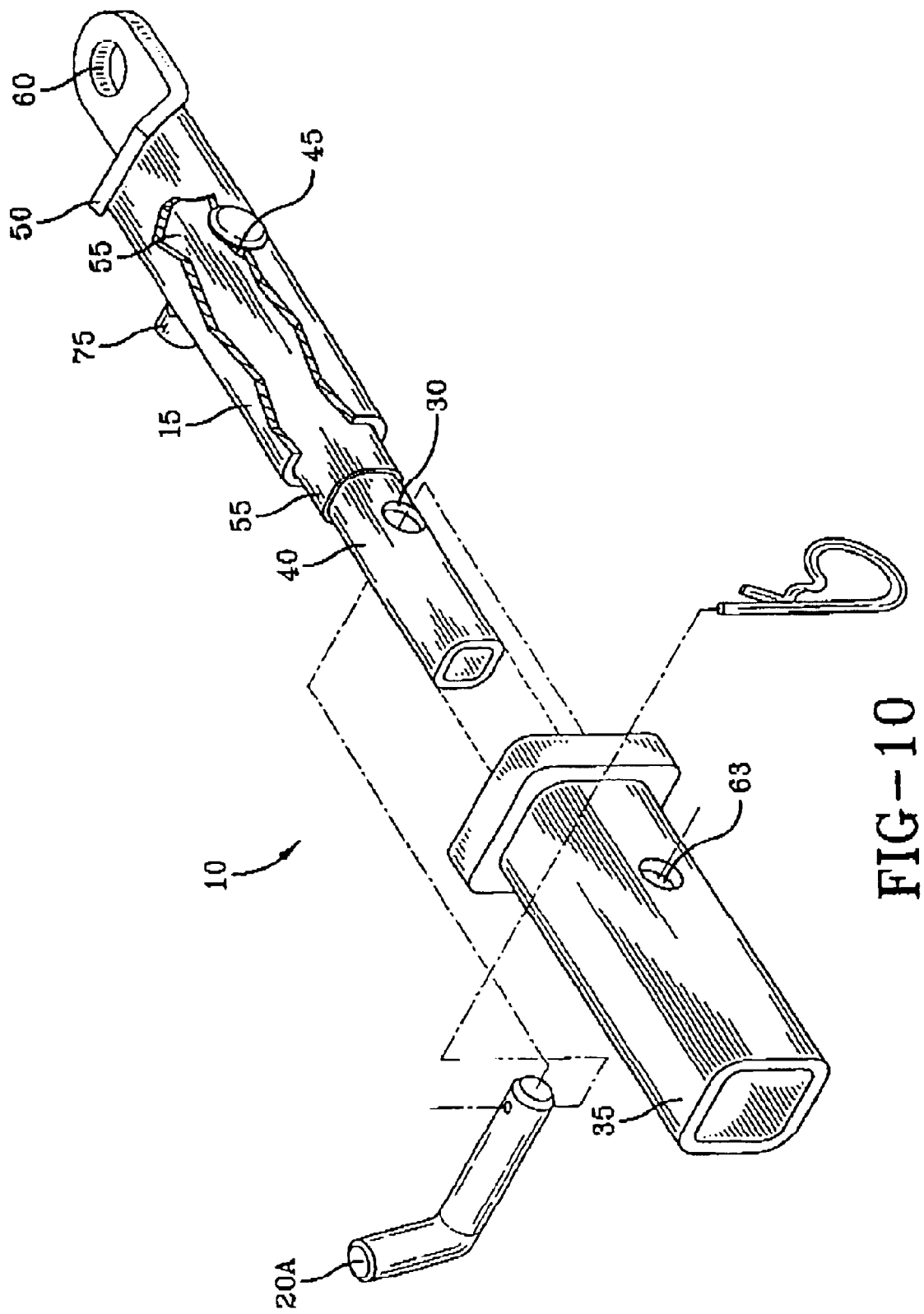
FIG. 10 is a perspective view of an alternative embodiment of the vibration and shock isolating hitch drawbar of the present invention to be used in smaller 1¼" receiver openings, and being cutaway to show the details of the internal assembly.

There is shown in FIG. 9, an alternative embodiment to be used in industry standard 1¼" receiver tubes. Referring now to FIG. 10, a perspective view of the alternative embodiment of the vibration and shock isolating hitch drawbar of the present invention for use in smaller 1¼" receiver openings, is a cutaway view to show the details of the internal assembly. In this embodiment, the outer housing or tube 15 is fixed to the ball mount bracket 50, while the inner housing or tube 40, a forward portion of which projects from the outer housing, is secured therein using clamp 75, through ovate cross hole 45. The projecting portion of the inner housing 40 fits within receiver tube 35, for securing using the curved hitch pin 20A using a single spring clip 80 when cross hole 63 coincides with cross hole 30.

It should be understood that although the present invention is described in detail for its particular embodiments, there may be other variations and modifications that will become apparent to those who are skilled in the art upon reading this specification, and that these modifications or variations that can be made should not detract from the true spirit of this invention.

What is claimed is:

1. A drawbar for a tow hitch, comprising:

an inner housing and an outer housing with a longitudinally mounted elastomeric member therebetween, the elastomeric member comprising a resilient linear damping element communicating with both the inner and the outer housing with a resistance to omnidirectional forces applied to the drawbar from a towing vehicle or a drawn load;

the inner and outer housing each having a pair of coincident cross holes;

wherein each of the cross holes of the inner housing are larger than the corresponding cross holes of the outer housing.

2. A drawbar for a tow hitch according to claim 1, the hitch including a hitch pin for insertion in the through slots and displaced orthogonal to a longitudinal axis of said inner and said outer housing.

3. A drawbar for a tow hitch according to claim 2, wherein the elastomeric member surrounds the inner housing.

4. A drawbar for a tow hitch according to claim 3, wherein a forward end of the inner housing extends forward beyond the surrounding elastomeric member.

5. A drawbar for a tow hitch according to claim 4, wherein each of the inner housing cross holes are ovately shaped with a minor vertical axis and a major horizontal axis, thereby allowing sufficient clearance from the hitch pin in the minor vertical axis and the major horizontal axis to permit vertical and horizontal motions without contacting the hitch pin during normal use.

6. A drawbar for a tow hitch according to claim 5, wherein the hitch pin includes a coating of an elastomeric material that provides an elastomerically cushioned hinge pin to further attenuate transmission of shock, noise, bounce and vibration between a tow vehicle and a towed load.

7. A drawbar for a tow hitch according to claim 6, further comprising an outboard end of the inner housing that extends beyond an outboard end of the outer housing and wherein the inner housing is welded to a trailer connection.

8. A drawbar for a tow hitch according to claim 7, the outer housing and the inner housing each having a square shape.

9. A drawbar for a tow hitch according to claim 7, the outer housing and the inner housing each having a cylindrical tube shape.

10. A drawbar for a tow hitch according to claim 1, the outer housing and the inner housing each comprising a low carbon steel that has the mechanical strength to withstand a hoop stress and additional forces occurring in all directions placed thereupon by the elastomeric member and a hitch receiver of the tow vehicle.

11. A drawbar for a tow hitch according to claim 10, wherein the low carbon steel square outer housing fits over a receiver tube of the tow vehicle.

12. A drawbar for a tow hitch according to claim 1, the elastomeric member including a plurality of high hysteresis elastomer sleeves that are compressed and contained between the inner housing and outer housing to provide total isolation from noise or vibration that may be conducted from one housing to the other during typical operation and to dampen forces imposed upon the tow vehicle by an inertia of the towed load.

13. A drawbar for a tow hitch according to claim 12, wherein the elastomeric member comprises a natural rubber that is vulcanized, and bonded to an inner metal surface of the outer housing and an outer metal surface of the inner housing.

14. A drawbar for a tow hitch according to claim 12, wherein the elastomeric member is comprised of a synthetic rubber that is chemically bonded to an inner metal surface of the outer housing and an outer metal surface of the inner housing.

15. An elastomerically isolated tow hitch drawbar comprising:
   a square inner tube welded to a bracket of a towed load, the inner tube displaced within a square outer tube with at least one elastomeric sleeve compressed between the inner and the outer tube to provide total isolation from noise or vibration that may be conducted from one tube to the other;
   the inner tube having ovately shaped cross holes on both sides, wherein a horizontal diameter of each of the holes is larger than a vertical diameter thereof, and wherein, the inner tube cross holes are coincident with circular cross holes of the outer tube;
   wherein the outer tube is slidably insertable into standard a receiver tube of a towing vehicle, the receiver tube including cross holes on both sides, with a hitch pin insertable through the tube holes to secure the towed load to a low vehicle provides a clamp to absorb any play between the receiver tube and the drawbar tubes and to direct all of the shock, noise, bounce and vibration that are typically related when towing through the at least one elastomeric sleeve.

16. An elastomerically isolated tow hitch drawbar comprising:
   an outer tube welded to a bracket of a towed load having an inner tube displaced within the outer tube with at least one elastomeric sleeve compressed between the inner, and the outer tubes to provide total isolation from noise or vibration that may be conducted from one tube to the other;
   wherein a forward end of the inner tube extends beyond and projects from a forward end of the outer tube, the inner tube having ovately shaped cross holes on both sides, which are coincident with circular cross holes of the outer tube to receive a clamp inserted in the tube holes to retain the inner tube within the outer tube;
   the inner tube including cross holes on each side near its forward end; and, the inner tube slidably insertable into a receiver tube of a towing vehicle, the receiver tube including cross holes on both sides to receive a hitch pin insertable through the inner tube and receiver tube holes to secure the towed load to the tow vehicle, wherein the clamp absorbs any play between the receiver tube and the drawbar tubes and directs all of the shock, noise, bounce and vibration that are typically related when towing through the at least one elastomeric sleeve.

17. An elastomerically isolated tow hitch drawbar according to claim 16, wherein the at least one elastomeric sleeve is compressed between the inner and the outer tubes, provides a maximum surface area of elastomeric material in a linear arrangement between the tubes, and comprises in a shear mode of operation a reduced shearing stress, wherein the shearing stress equals an applied longitudinal force divided by a surface area of the elastomeric material.

* * * * *